US012767535B2

(12) United States Patent
Mo et al.

(10) Patent No.: US 12,767,535 B2
(45) Date of Patent: Oct. 20, 2026

(54) PROCESS OF SYNTHESIZING CATHODE MATERIAL

(71) Applicants: Boston Global Technologies Limited, Newton, MA (US); HK Institute of Boston Global Technologies Limited, Hong Kong (CN)

(72) Inventors: Boshan Mo, Newton, MA (US); Guiqing Huang, Newton, MA (US); Ming Yi, Nanning (CN); ChunJiao Meng, Nanning (CN); Xiaopeng Ding, Nanning (CN); Youde Mo, Newton, MA (US)

(73) Assignee: Boston Global Technologies Limited, Newton, MA (US)

( * ) Notice: Subject to any disclaimer, the term of this patent is extended or adjusted under 35 U.S.C. 154(b) by 285 days.

(21) Appl. No.: 18/395,423

(22) Filed: Dec. 22, 2023

(65) Prior Publication Data

US 2024/0208820 A1 Jun. 27, 2024

Related U.S. Application Data

(60) Provisional application No. 63/477,168, filed on Dec. 23, 2022.

(51) Int. Cl.
*H01M 4/58* (2010.01)
*C01B 25/45* (2006.01)

(52) U.S. Cl.
CPC ........... *C01B 25/45* (2013.01); *H01M 4/5825* (2013.01); *C01P 2002/72* (2013.01); *C01P 2004/62* (2013.01); *C01P 2004/84* (2013.01); *C01P 2006/40* (2013.01)

(58) Field of Classification Search
CPC ............... H01M 4/136; H01M 4/1397; H01M 2004/028; Y02E 60/10
See application file for complete search history.

(56) References Cited

U.S. PATENT DOCUMENTS

2014/0054494 A1* 2/2014 Huang .................... C01B 25/45 252/182.1

FOREIGN PATENT DOCUMENTS

CN 115353084 A * 11/2022 ............. C01B 25/45

* cited by examiner

*Primary Examiner* — Khanh T Nguyen
(74) *Attorney, Agent, or Firm* — George Guosheng Wang; Upstream Research and Patent LLC

(57) ABSTRACT

The present invention provides a novel process of synthesizing a cathode material. A metal selected from Fe, Mn, Co, Ni, Cu, Zn, Al, Ca, Mg, Ti, V, Cr, Mo or any combination thereof is partially oxidized with an agent such as $H_3PO_4$. Then, the metal is fully oxidized with an oxidizing agent such as $H_2O_2$. Finally, preparation of the cathode material is completed. The process exhibits numerous technical merits such as less water consumption, less electricity usage, improved product purity, and less usage of base raw materials (e.g. NaOH, Na2$CO_3$, $NH_3$·H2O), among others.

20 Claims, 11 Drawing Sheets

PROCESS OF SYNTHESIZING CATHODE MATERIAL

CROSS-REFERENCE TO RELATED APPLICATIONS

This non-provisional application expressly claims the benefit of priority under 35 U.S.C. Section 119(e) of U.S. Provisional Patent Application No. 63/477,168 filed on Dec. 23, 2022, which is incorporated herein by reference in its entirety.

FIELD OF THE INVENTION

The present invention generally relates to a process of synthesizing cathode material, and a method thereof. Although the invention will be illustrated, explained, and exemplified by a process of preparing a cathode material based on $LiFePO_4$ for a lithium secondary battery, it should be appreciated that the present invention can also be applied to other cathode materials.

BACKGROUND OF THE INVENTION

In recent years, electric vehicles and hybrid electric vehicles require advanced battery materials to meet the high demand and performance, in addition to portable electronic devices such as cellular phones, pagers, video cameras, facsimile machines, portable stereophonic equipment, personal organizers and personal computers. As a result, the demand for improved power sources for these devices has been increased. Preferably, the battery materials are environmentally benign and relatively low cost to make these expanded battery applications practical.

Lithium-based batteries have become commercially successful due to their relatively high energy density. Lithium-based batteries generally use electrolytes containing lithium ions. The negative electrodes for these batteries can include lithium metal or alloy (lithium batteries), or compositions that intercalate lithium (lithium-ion batteries). Preferred electroactive materials for incorporation into the positive electrodes are compositions that intercalate lithium. For example, metal phosphates are candidates to produce cathode materials that intercalate lithium.

An example of lithium-ion battery is the lithium iron phosphate ($LiFePO_4$, LFP) battery, in which $LiFePO_4$ is used as the cathode material. LFP exhibits some advantages such as low cost, non-toxicity, natural abundance, excellent thermal stability, safety characteristics, electrochemical performance, and specific capacity (170 mA·h/g, or 610 C/g). As such, LFP battery is even finding several roles in vehicle use and backup power, among others.

For example, a process of preparing carbon coated $LiFePO_4$ cathode materials includes (i) adding a base (e.g. NaOH) to a reaction mixture of Fe salt solution such as $FeSO_4$ solution, $H_3PO_4$, and $H_2O_2$ at pH=1-3, and reacting to produce $FePO_4$+H2O; and then (ii) reacting a Li source (such as $Li_2CO_3$ or LiOH) with $FePO_4$ and a carbon source material such as glucose. The Fe salt aqueous solution such as $FeSO_4$ solution can be provided by dissolving $FeSO_4$ and/or $FeCl_2$ of industrial grade in water. However, such a process is problematic and unsatisfactory because its cost is relatively high, it is not environmentally friendly, its product purity is not super high, and/or it also wastes a lot of water and energy.

Thus, there exists a need for simpler, less water-consuming, more environmentally friendly, and more cost-effective methods for preparing cathode material such as nanosized $LiFePO_4$ particles. Advantageously, the present invention provides a novel process of synthesizing cathode material that can overcome the problems.

SUMMARY OF THE INVENTION

One aspect of the present invention provides a process of synthesizing a target cathode material. The process includes (i) mixing a P source containing element P with a first metal source containing one or more metal elements selected from Fe, Mn, Co, Ni, Cu, Zn, Al, Ca, Mg, Ti, V, Cr, Mo or any combination thereof, to form a first intermediate material. In step (i), a portion of at least one element (such as Fe) among the one or more metal elements is oxidized. Step (ii) of the process is mixing and reacting the first intermediate material with an oxidizing agent to oxidize a remaining portion of the at least one element among the one or more metal elements, to form a second intermediate material. Further, the process includes step (iii) of mixing the second intermediate material with one or more add-on source materials selected from a P source containing element P, a first metal source containing one or more metal elements selected from Fe, Mn, Co, Ni, Cu, Zn, Al, Ca, Mg, Ti, V, Cr, Mo or any combination thereof, and a second metal source containing one or more elements selected from Li, Na, K or any combination thereof. The one or more add-on source materials are introduced in an amount or amounts that are needed for accomplishing a formula of the target cathode material.

Other features and advantages of the present invention are readily apparent from the following detailed description of the best modes for carrying out the invention when taken in connection with the accompanying drawings (if any).

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form, omitted, or merely suggested, in order to avoid unnecessarily obscuring the present invention.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein (such as 10~30% $H_3PO_4$ solution), unless otherwise specified, such range is continuous, inclusive of both the minimum and maximum values of the range as well as every value between such minimum and maximum values (such as 15~25% $H_3PO_4$ solution). Still further, where a range refers to integers, only the integers from the minimum value to and including the maximum value of such range are included. In addition, where multiple ranges are provided to describe a feature or characteristic, such ranges can be combined.

It is also to be understood that the terminology used herein is for the purpose of describing particular embodiments only, and is not intended to limit the scope of the invention. For example, when an element is referred to as being "on", "connected to", or "coupled to" another element, it can be directly on, connected or coupled to the other element or intervening elements may be present. In contrast, when an element is referred to as being "directly on", "directly connected to", or "directly coupled to" another element, there are no intervening elements present.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 1:
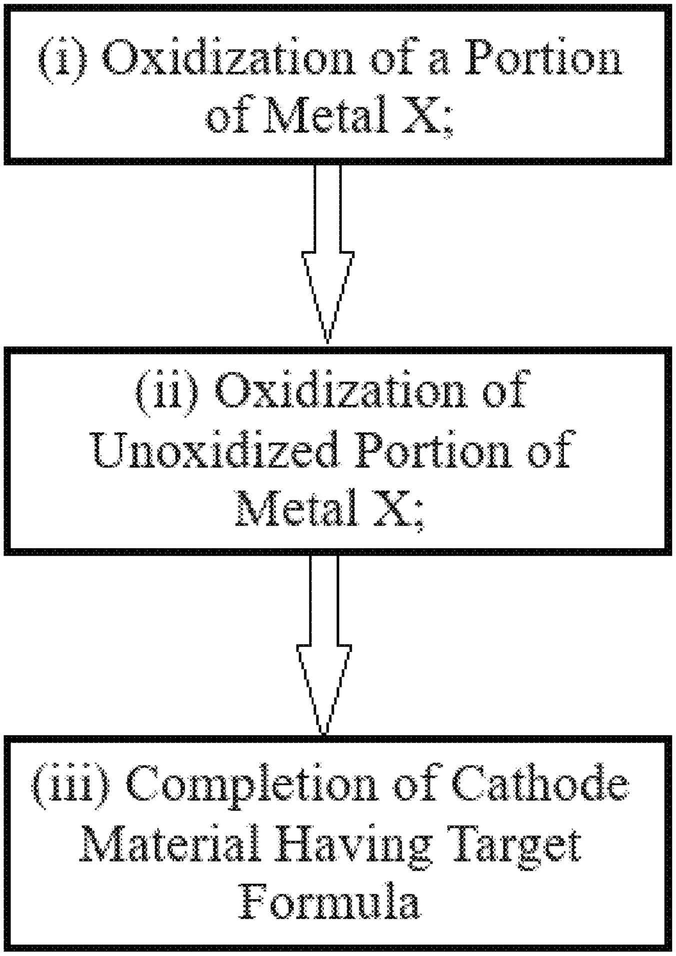
FIG. 1 is a flow chart that illustrates a general process of synthesizing a target cathode material in accordance with an exemplary embodiment of the present invention.

In various exemplary embodiments, the present invention provides a process of synthesizing a target cathode material as shown in FIG. 1. Briefly, the process includes (i) oxidization of a portion of metal X; (ii) oxidization of unoxidized portion of the metal X; and (iii) completion of the cathode material having a target formula. For example, the cathode material may have a target formula of $Li_{1.04}Fe_{0.98}PO_4$, which will be used as a specific but only representative example for explaining the process.

Steps (i), (ii) and (iii) may be conducted in one single container. Alternatively, steps (i), (ii) and (iii) may be conducted in two or more containers. For example, steps (i) and (ii) are conducted in one container while step (iii) is conducted in another container. Steps (ii) and (iii) are conducted in one container while step (i) is conducted in another container. Steps (i), (ii) and (iii) are conducted separately in three separate containers. In preferred embodiments, steps (i), (ii) and (iii) are conducted in one single container.

Step (i) comprises mixing a P source containing element P with a first metal source containing one or more metal elements selected from Fe, Mn, Co, Ni, Cu, Zn, Al, Ca, Mg, Ti, V, Cr, Mo or any combination thereof, to form a first intermediate material. In step (i), a portion of at least one element (such as Fe) among the one or more metal elements is oxidized. For the exemplary target formula of $Li_{1.04}Fe_{0.98}PO_4$, Fe Powder of 25-2000 um in 10-30% $H_3PO_4$ solution [molar ratio Fe:P=0.98:1] may be added into a container and heated for 1-8 hours (T=60-100° C.) to oxidize a portion of the Fe powder and produce the first intermediate material.

Step (ii) of the process may be conducted in a different container, or in the same container as in step (i), i.e. without transferring the first intermediate material to any other reaction container(s) or equipment(s) such as a milling apparatus. This step is mixing and reacting the first intermediate material with an oxidizing agent to oxidize a remaining portion of the at least one element [which was unoxidized in step (i)] among the one or more metal elements, to form a second intermediate material. For the exemplary target formula of $Li_{1.04}Fe_{0.98}PO_4$, one or more oxidants such as $O_2$, $H_2O_2$ and $HNO_3$ may be introduced to push/promote the Fe oxidization to completeness. The remaining Fe powder that is not oxidized in step (i) may be oxidized in this step, to produce the second intermediate material comprising a mixture of Fe in oxidized form(s) and phosphate.

Step (iii) of the process may be conducted in a different container, or in the same container as in step (ii) without transferring the second intermediate material to any other reaction container(s) or equipment(s) such as a milling apparatus. Step (iii) comprises mixing the second intermediate material with one or more add-on source materials selected from a P source containing element P, a first metal source containing one or more metal elements selected from Fe, Mn, Co, Ni, Cu, Zn, Al, Ca, Mg, Ti, V, Cr, Mo or any combination thereof, and a second metal source containing one or more elements selected from Li, Na, K or any combination thereof. The one or more add-on source materials may be introduced in an amount or amounts that are needed for accomplishing a formula of the target cathode material.

It should be appreciated that the P source in step (iii) may be the same as, or different from, the P source in step (i). The first metal source in step (iii) may be the same as, or different from, the first metal source in step (i).

For the exemplary target formula of $Li_{1.04}Fe_{0.98}PO_4$, a Li source (such as $Li_2CO_3$) and a C source (e.g. glucose) may be introduced in step (iii) and mixed with the second intermediate material therein. As an add-on source material, the Li source may be introduced in an amount that is needed for accomplishing target formula of $Li_{1.04}Fe_{0.98}PO_4$. In this example, the Li source may be introduced in an amount to make the molar ratio Li:P=1.04:1 in the container.

It should be appreciated that, if the target formula is $Cx\cdot Li_{1.04}Fe_{0.98}PO_4$ (which stands for carbon-coated lithium iron phosphate cathode material), then step (iii) may further comprise mixing the second intermediate material with a C source material (e.g. glucose) in a suitable amount. By "suitable amount," it is indented to mean that the amount of C source material is enough to make the molar ratio of C:P=x:1, or molar ratio of C:Li=x:1.04.

In alternative but still exemplary embodiments, steps (i), (ii) and/or (iii) may be modified to achieve the exemplary target formula of $Li_{1.04}Fe_{0.98}PO_4$ as mentioned above. For example, the molar ratio Fe:P in step (i) may be lowered to 0.8:1. As a result, step (iii) is so adjusted that an add-on Fe source material (in addition to the Li source and the C source) may be introduced into the container and mixed with the second intermediate material therein. The add-on Fe source material in step (iii) may have a molar ratio of Fe:P=0.18:1 relative to the amount (moles) of P present in the container. The same final molar ratio of Fe:P=0.98:1 is also achieved after such step (iii) is completed. The add-on Fe source material in step (iii) may be selected from Fe2+ and Fe3+ compounds such as FeO, $Fe_2O_3$, $Fe_3O_4$, $FeCO_3$, and $FeC_2O_4$.

In exemplary embodiments, the P source in step (i) and step (iii) may be selected from $H_3PO_4$, a salt of $H_2PO_4^-$, a salt of $HPO_4^{2-}$, a salt of $PO_4^{3-}$, or any combination thereof. The P source in step (i) may include 5-55% $H_3PO_4$ aqueous solution, preferably 10-30% $H_3PO_4$ aqueous solution, and more preferably 15-25% $H_3PO_4$ aqueous solution. The first metal source in step (i) may comprise a metallic powder (i.e. with a valence of 0) of Fe, Mn, Co, Ni, Cu, Zn, Al, Ca, Mg, Ti, V, Cr, Mo or any combination thereof. In preferred embodiments, the first metal source in step (i) comprises iron powder (i.e. with a Fe valence of 0) and/or Mn powder (i.e. with a Mn valence of 0).

Without being bound to any particular theory, it is believed that an element selected from Fe, Mn, Co, Ni, Cu, Zn, Al, Ca, Mg, Ti, V, Cr, and Mo in the first metal source is partially oxidized.

In an example, a single displacement reaction (AKA exchange reaction) may occur between iron powder and $H_3PO_4$ solution in step (i). In step (ii), the first intermediate material is mixed and reacted with an oxidizing agent (which typically is not $H^+$) to oxidize the unoxidized portion of the partially oxidized metal, to form a second intermediate material.

In exemplary embodiments, the oxidizing agent in step (ii) may be selected from $O_2$, $H_2O_2$, $HNO_3$, $KMnO_4$, $NaMnO_4$, or any combination thereof. Step (i) may include heating the reaction mixture to an elevated temperature such as 40-100° C. for 1-10 hours; and step (ii) may include maintaining the reaction mixture at the elevated temperature such as 40-100° C.

In exemplary embodiments, the first metal source in step (iii) may comprise a metal compound selected from oxides, hydrogen carbonates, hydrogen sulfates, hydrogen oxalates, carbonates, sulfates, and oxalates of Fe, Mn, Co, Ni, Cu, Zn, Al, Ca, Mg, Ti, V, Cr, Mo or any combination thereof. In preferred embodiments, the first metal source in step (iii) may comprise a metal compound selected from FeO, $Fe_2O_3$, $Fe_3O_4$, $FeC_2O_4$, MnO, $Mn_2O_3$, $Mn_3O_4$, $MnCO_3$, $MnO_2$, CoO, $Co_2O_3$, and $Co_3O_4$. In exemplary embodiments, the second metal source in step (iii) may comprise a metal compound selected from oxides, hydroxides, carbonates, hydrogen carbonates, phosphates, hydrogen phosphates, dihydrogen phosphates, nitrates, oxalates and hydrogen oxalates of Li, Na, K or any combination thereof. In preferred embodiments, the second metal source in step (iii) comprises a metal compound selected from $Li_2O$, LiOH, $Li_2CO_3$, $LiHCO_3$, $Li_3PO_4$, $Li_2HPO_4$, $LiH_2PO_4$, $Li_2C_2O_4$, $LiHC_2O_4$, $LiNO_3$, $Na_2O$, NaOH, $Na_2CO_3$, $NaHCO_3$, $Na_3PO_4$, $Na_2HPO_4$, $NaH_2PO_4$, $Na_2C_2O_4$, $NaHC_2O_4$, $K_2O$, KOH, $K_2CO_3$, $KHCO_3$, $K_3PO_4$, $K_2HPO_4$, $KH_2PO_4$, $K_2C_2O_4$, $KHC_2O_4$, $NaNO_3$, $KCH_3CO_2$, $KHCO_2$, and $KNO_3$.

In some exemplary embodiments, the P source and the first metal source in step (iii) may be combined into a composite source such as a mixture of compounds. The P source and the second metal source in step (iii) may be combined into a composite source such as $Li_3PO_4$, $Na_3PO_4$, $K_3PO_4$, $Li_2HPO_4$, $Na_2HPO_4$, $K_2HPO_4$, $LiH_2PO_4$, $NaH_2PO_4$, and $KH_2PO_4$. The first metal source and the second metal source in step (iii) may be combined into a composite source such as $KMnO_4$.

In some exemplary embodiments, step (iii) may further comprise mixing the second intermediate material with a C source material (e.g. glucose).

Within step (iii) or after step (iii) of the process of the invention, other known steps or reaction schemes may be conducted. For example, the process may further comprise milling or grinding the product from step (iii) to cream-like particles having an average size of 300~400 nm after step (iii) is completed; drying (such as spray drying) the cream-like particles to produce dry particles in a powder form; calcining the dry particles into a solid, grinding the solid into ground particles, and sieving the ground particles to collect nanosized carbon-coated cathode materials.

EXAMPLES

The following examples illustrate the synthesis of various cathode materials according to the present invention. Additional cathode materials within the scope of this invention may be prepared using the methods exemplified and illustrated in these Examples, either alone or in combination with techniques generally known in the prior art.

Example 1: Lithium Iron Phosphate with a Target Molar Ratio Fe:P=(0.95-1):1

In step (i), Fe Powder of 25-2000 um in 15-25% $H_3PO_4$ solution [molar ratio Fe:P=(0.95-1):1] is added into a container and heated for 1-8 hours (T=60-100° C.) to oxidize a portion of the Fe powder and produce the first intermediate material. In step (ii), one or more oxidants such as $O_2$, $H_2O_2$ and $HNO_3$ are introduced in the same container (or a different container), to push/promote the Fe oxidization to completeness. The remaining Fe powder that is not oxidized in step (i) is oxidized in this step, to produce the second intermediate material comprising a mixture of Fe in oxidized form(s) and phosphate. In step (iii), a Li source (such as $Li_2CO_3$) and a C source (e.g. glucose) are introduced into the same container (or the different container) and mixed with the second intermediate material therein. As an add-on source material, the Li source is introduced in an amount or amounts that are needed for accomplishing a formula of the target cathode material. For example, if $Li_{1.04}Fe_{0.98}PO_4$ is the formula of the target cathode material, then the Li source is introduced in an amount to make the molar ratio Li:P=1.04:1 in the container, which ratio is needed for accomplishing the formula.

The reaction mixture from step (iii) is transferred to a ball mill or a sand mill and subject to milling or grinding to produce particles of 200-400 nm as a creamy product. The creamy product is then dried such as by spray drying and converted to a powder form. The powder is then calcined, grinded in a ball mill or a sand mill, and then sieved to collect nanosized carbon-coated lithium iron phosphate cathode material.

The cost per ton of $FePO_4$ product prepared from the invention is reduced as compared to the prior art process as described in the background. For example, the water consumption can be reduced from 30-50 tons down to 3-5 tons. The electricity can be reduced from 2000-2500 kilowatt-hours down to 400-500 kilowatt-hours. The product impurity Na can be reduced from ~150 ppm down to nearly ~0 ppm. Unlike the prior art, base as raw materials (e.g. NaOH, $Na_2CO_3$, $NH_3 \cdot H_2O$) are not used in the process of the invention.

Example 2: Lithium Iron Phosphate with a Target Molar Ratio Fe:P=(0.95-1):1

The process in this example is similar to that in Example 1 except that the molar ratio Fe:P is (0.75-0.95):1 in step (i). As a result, step (iii) is so adjusted that an add-on Fe source material (in addition to the Li source and the C source) is introduced into the container (or a different container) and mixed with the second intermediate material therein. The add-on Fe source material may have a molar ratio Fe:P of >0:1 and up to 0.2:1, relative to the moles of P present in the container. The final molar ratio Fe:P becomes (0.95-1):1 after step (iii) is completed. The add-on Fe source material is this step can be selected from $Fe^{2+}$ and $Fe^{3+}$ compounds such as FeO, $Fe_2O_3$, $Fe_3O_4$, $FeCO_3$, and $FeC_2O_4$.

Example 3: Lithium Iron Phosphate with a Target Molar Ratio Li:Fe:P=1:1:1

The process in this example is like that in Example 1 except that: the molar ratio Fe:P is 1:1 in step (i). In step (ii), $H_2O_2$ is introduced in the same container (or a different container), to push/promote the Fe oxidization to completion. In step (iii), LiOH as the second metal source is introduced into the container and mixed with the second intermediate material therein to produce the cathode active material.

Example 4: Lithium Iron Phosphate with a Target Molar Ratio Li:Fe:P=1:1:1

The process in this example is like that in Example 1 except that: the molar ratio Fe:P is 1:1 in step (i). In step (ii), $O_2$ is introduced in the same container (or a different container), to push/promote the Fe oxidization to completion. In step (iii), LiOH as the second metal source is introduced into the container and mixed with the second intermediate material therein to produce the cathode active material.

Example 5: Lithium Iron Phosphate with a Target Molar Ratio Li:Fe:P=1:1:1

The process in this example is like that in Example 1 except that: the molar ratio Fe:P is 1:1 in step (i). In step (ii), $HNO_3$ is introduced in the same container (or a different container), to push/promote the Fe oxidization to completion. In step (iii), LiOH as the second metal source is introduced into the container and mixed with the second intermediate material therein to produce the cathode active material.

Example 6: Lithium Iron Phosphate with a Target Molar Ratio Li:Fe:P=1:1:1

The process in this example is like that in Example 1 except that: the molar ratio Fe:P is 1:1 in step (i). In step (ii), $H_2O_2$ is introduced in the same container (or a different container), to push/promote the Fe oxidization to completion. In step (iii), $Li_2CO_3$ as the second metal source (molar ratio $Li_2CO_3$:P=1:2) is introduced into the container and mixed with the second intermediate material therein to produce the cathode active material.

Example 7: Lithium Iron Phosphate with a Target Molar Ratio Li:Fe:P=1:1:1

The process in this example is like that in Example 1 except that: the molar ratio Fe:P is 1:⅔ in step (i). In step (ii), $H_2O_2$ is introduced to push/promote the Fe oxidization to completion. In step (iii), $Li_3PO_4$ as the second metal source is introduced and mixed with the second intermediate material therein to produce the cathode active material. The molar ratio between Fe present in the second intermediate material and the add-on $Li_3PO_4$ and is 1:⅓.

Example 8: Sodium Iron Phosphate with a Target Molar Ratio Na:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), NaOH as the second metal source is introduced and mixed with the second intermediate material therein to produce the cathode active material.

Example 9: Sodium Iron Phosphate with a Target Molar Ratio Na:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), $NaHCO_3$ as the second metal source is introduced and mixed with the second intermediate material therein to produce the cathode active material.

Example 10: Sodium Iron Phosphate with a Target Molar Ratio Na:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), $NaNO_3$ as the second metal source is introduced and mixed with the second intermediate material therein to produce the cathode active material.

Example 11: Sodium Iron Phosphate with a Target Molar Ratio Na:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), $Na_2O$ as the second metal source is introduced and mixed with the second intermediate material therein to produce the cathode active material.

Example 12: Sodium Iron Phosphate with a Target Molar Ratio Na:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), $Na_2CO_3$ as the second metal source is introduced and mixed with the second intermediate material therein to produce the cathode active material.

Example 13: Sodium Iron Phosphate with a Target Molar Ratio Na:Fe:P=1:1:1

The process in this example is like that in Example 1 except that: the molar ratio Fe:P is 1:⅔ in step (i). In step (ii), $H_2O_2$ is introduced to push/promote the Fe oxidization to completion. In step (iii), $Na_3PO_4$ as the second metal source is introduced and mixed with the second intermediate material therein to produce the cathode active material. The molar ratio between Fe present in the second intermediate material and the add-on $Na_3PO_4$ and is 1:⅓.

Example 14: Potassium Iron Phosphate with a Target Molar Ratio K:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), KOH as the second metal source is introduced and mixed with the second intermediate material therein to produce the cathode active material.

Example 15: Potassium Iron Phosphate with a Target Molar Ratio K:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), $KHC_2O_4$ as the second metal source is introduced and mixed with the second intermediate material therein to produce the cathode active material.

Example 16: Potassium Iron Phosphate with a Target Molar Ratio K:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), $KCH_3CO_2$ as the second metal source is introduced and mixed with the second intermediate material therein to produce the cathode active material.

Example 17: Potassium Iron Phosphate with a Target Molar Ratio K:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), $KHCO_2$ as the second metal source is introduced and mixed with the second intermediate material therein to produce the cathode active material.

Example 18: Potassium Iron Phosphate with a Target Molar Ratio K:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), $KHCO_3$ as the second metal source is introduced and mixed with the second intermediate material therein to produce the cathode active material.

Example 19: Potassium Iron Phosphate with a Target Molar Ratio K:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), $KNO_3$ as the second metal source is introduced and mixed with the second intermediate material therein to produce the cathode active material.

Example 20: Potassium Iron Phosphate with a Target Molar Ratio K:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), $K_2O$ as the second metal source is introduced and mixed with the second intermediate material therein to produce the cathode active material.

Example 21: Potassium Iron Phosphate with a Target Molar Ratio K:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), $K_2SO_4$ as the second metal source is introduced and mixed with the second intermediate material therein to produce the cathode active material.

Example 22: Potassium Iron Phosphate with a Target Molar Ratio K:Fe:P=1:1:1

The process in this example is like that in Example 1 except that: the molar ratio Fe:P is 1:1 in step (i). In step (ii), $H_2O_2$ is introduced to push/promote the Fe oxidization to completion. In step (iii), $K_2CO_3$ as the second metal source is introduced and mixed with the second intermediate material therein to produce the cathode active material.

Example 23: Potassium Iron Phosphate with a Target Molar Ratio K:Fe:P=1:1:1

The process in this example is like that in Example 1 except that: the molar ratio Fe:P is 1:⅔ in step (i). In step (ii), $H_2O_2$ is introduced to push/promote the Fe oxidization to completion. In step (iii), $K_3PO_4$ as the second metal source is introduced and mixed with the second intermediate material therein to produce the cathode active material. The molar ratio between Fe present in the second intermediate material and the add-on $K_3PO_4$ and is 1:⅓.

Example 24: Cathode Active Phosphate Material with a Target Molar Ratio Li:Fe:Mn:P=1:0.4:0.6:1

The process in this example is like that in Example 1 except that: a mixture of Li source and Mn source are used in step (i). The molar ratio Fe:P is 0.4:1 and the molar ratio Mn:P is 0.6:1 in step (i). In step (ii), $H_2O_2$ is introduced to push/promote the Fe and Mn oxidization to completion. In step (iii), LiOH as the second metal source is introduced and mixed with the second intermediate material therein to produce the cathode active material.

Example 25: Cathode Active Phosphate Material with a Target Molar Ratio Li:Fe:Mn:P=1:0.4:0.6:1

The process in this example is like that in Example 1 except that: the molar ratio Fe:P is 0.4:1 in step (i). In step (ii), $H_2O_2$ is introduced to push/promote the Fe oxidization to completion. In step (iii), MnO as the first metal source and LiOH as the second metal source are introduced and mixed with the second intermediate material therein to produce the cathode active material.

Example 26: Cathode Active Phosphate Material with a Target Molar Ratio Li:Fe:Mn:P=1:0.4:0.6:1

The process in this example is like that in Example 1 except that: the molar ratio Fe:P is 0.4:1 in step (i). In step (ii), $H_2O_2$ is introduced to push/promote the Fe oxidization to completion. In step (iii), $Mn_2O_3$ as the first metal source and LiOH as the second metal source are introduced and mixed with the second intermediate material therein to produce the cathode active material.

Example 27: Cathode Active Phosphate Material with a Target Molar Ratio Li:Fe:Mn:P=1:0.4:0.6:1

The process in this example is like that in Example 1 except that: the molar ratio Fe:P is 0.4:1 in step (i). In step (ii), $H_2O_2$ is introduced to push/promote the Fe oxidization to completion. In step (iii), Mn3O4 as the first metal source and LiOH as the second metal source are introduced and mixed with the second intermediate material therein to produce the cathode active material.

Example 28: Cathode Active Phosphate Material with a Target Molar Ratio Li:Fe:Mn:P=1:0.4:0.6:1

The process in this example is like that in Example 1 except that: the molar ratio Fe:P is 0.4:1 in step (i). In step (ii), $H_2O_2$ is introduced to push/promote the Fe oxidization to completion. In step (iii), $MnCO_3$ as the first metal source and LiOH as the second metal source are introduced and mixed with the second intermediate material therein to produce the cathode active material.

Example 29: Cathode Active Phosphate Material with a Target Molar Ratio Li:Fe:Mn:P=1:0.4:0.6:1

The process in this example is like that in Example 1 except that: the molar ratio Fe:P is 0.4:1 in step (i). In step (ii), $H_2O_2$ is introduced to push/promote the Fe oxidization to completion. In step (iii), MnO2 as the first metal source and LiOH as the second metal source are introduced and mixed with the second intermediate material therein to produce the cathode active material.

Example 30: Cathode Active Phosphate Material with a Target Molar Ratio K:Fe:Mn:P=1:0.4:0.6:1

The process in this example is like that in Example 1 except that: the molar ratio Fe:P is 0.4:1 in step (i). In step (ii), $H_2O_2$ is introduced to push/promote the Fe oxidization to completion. In step (iii), KMnO4 as a composite source (the first & second metal sources) and KOH as the second metal source are introduced and mixed with the second intermediate material therein to produce the cathode active material.

Example 31: Electrochemical Properties of Cathode Active Materials

Figure 2:
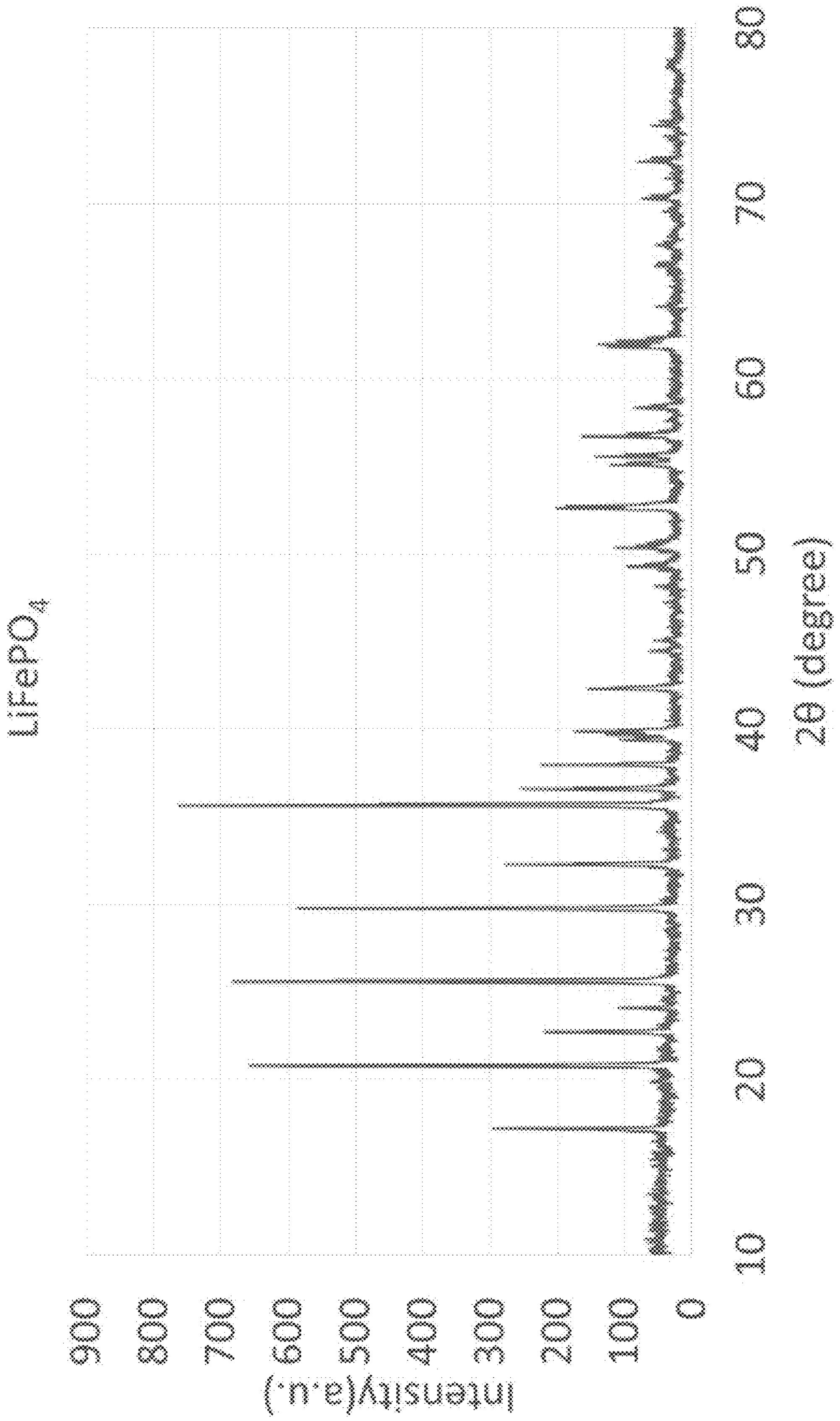
FIG. 2 shows an X-ray diffraction pattern of $LiFePO_4$ obtained in an exemplary embodiment of the present invention.
Figure 3:
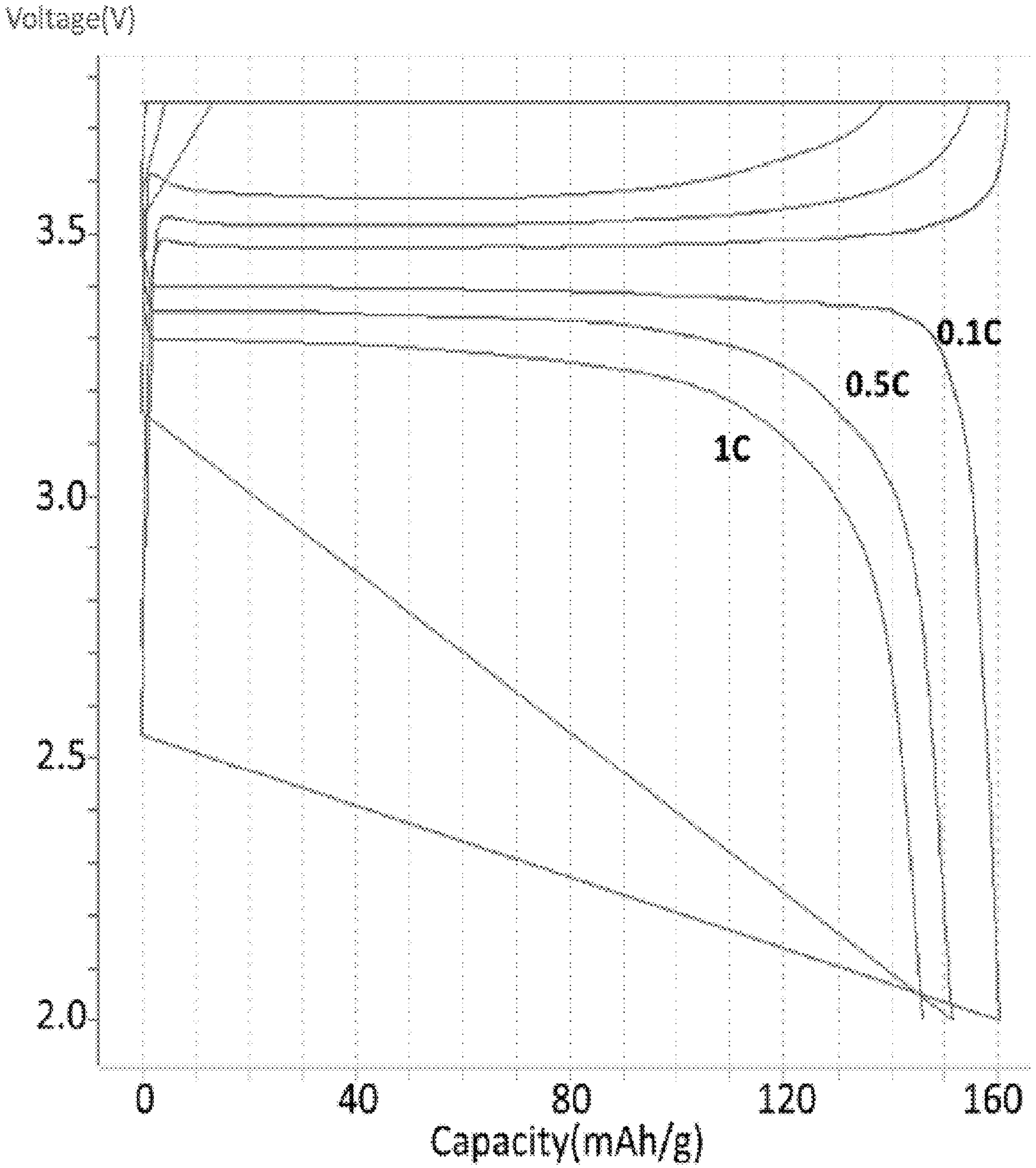
FIG. 3 shows the charge/discharge performance (Voltage vs. Capacity) of $LiFePO_4$ obtained in an exemplary embodiment of the present invention.
Figure 4:
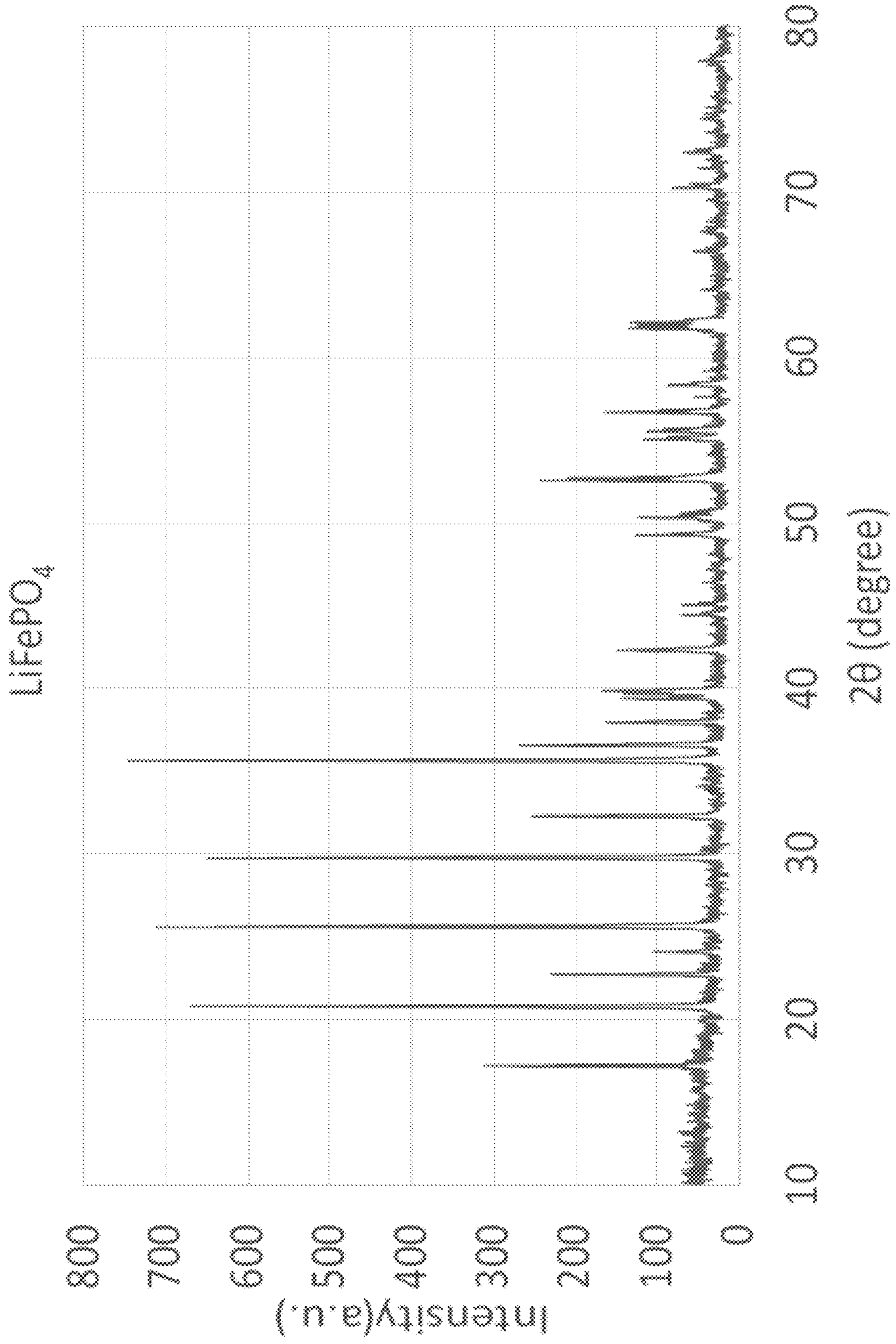
FIG. 4 shows an X-ray diffraction pattern of $LiFePO_4$ obtained in an exemplary embodiment of the present invention.
Figure 5:
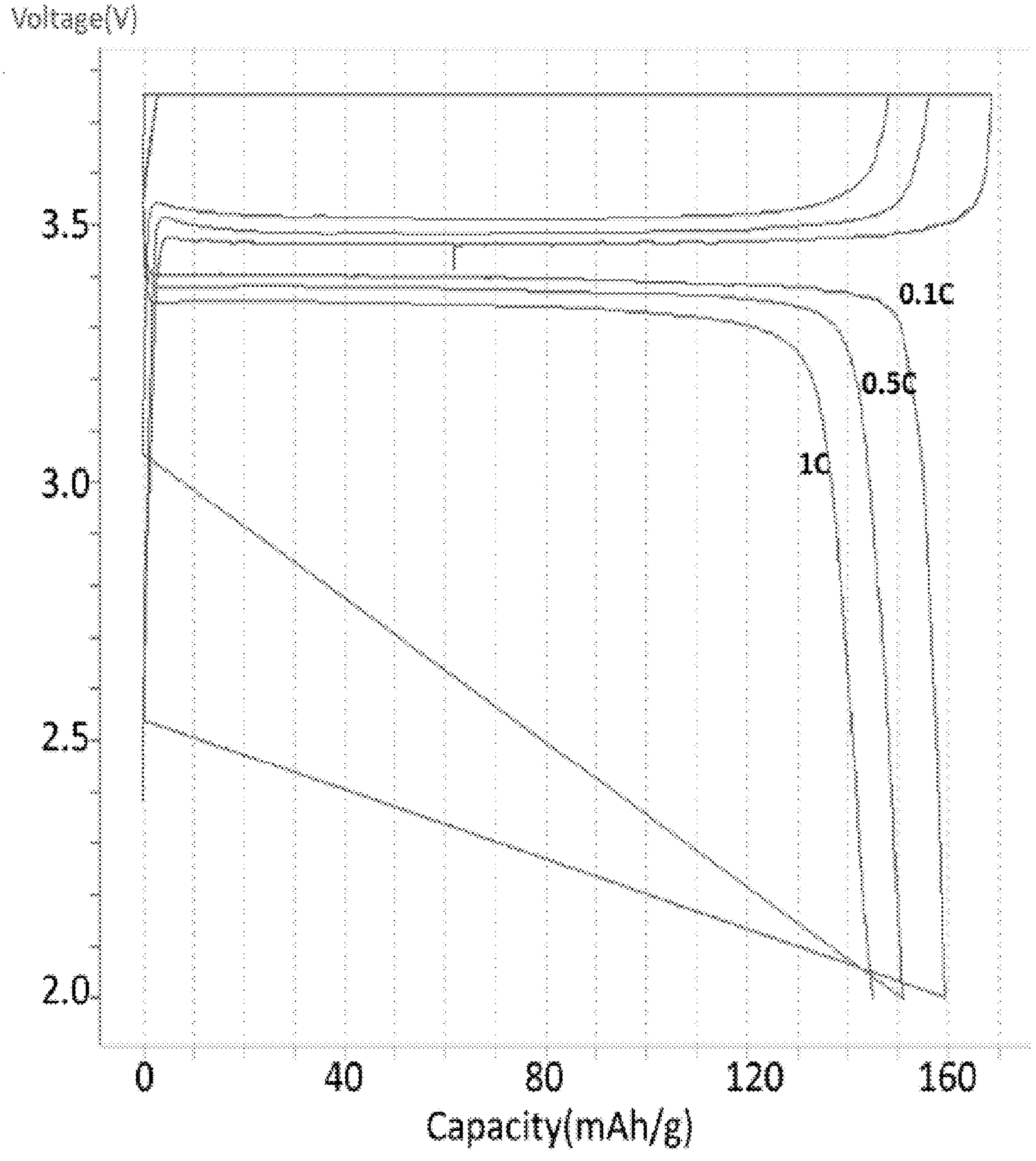
FIG. 5 shows the charge/discharge performance (Voltage vs. Capacity) of $LiFePO_4$ obtained in an exemplary embodiment of the present invention.
Figure 6:
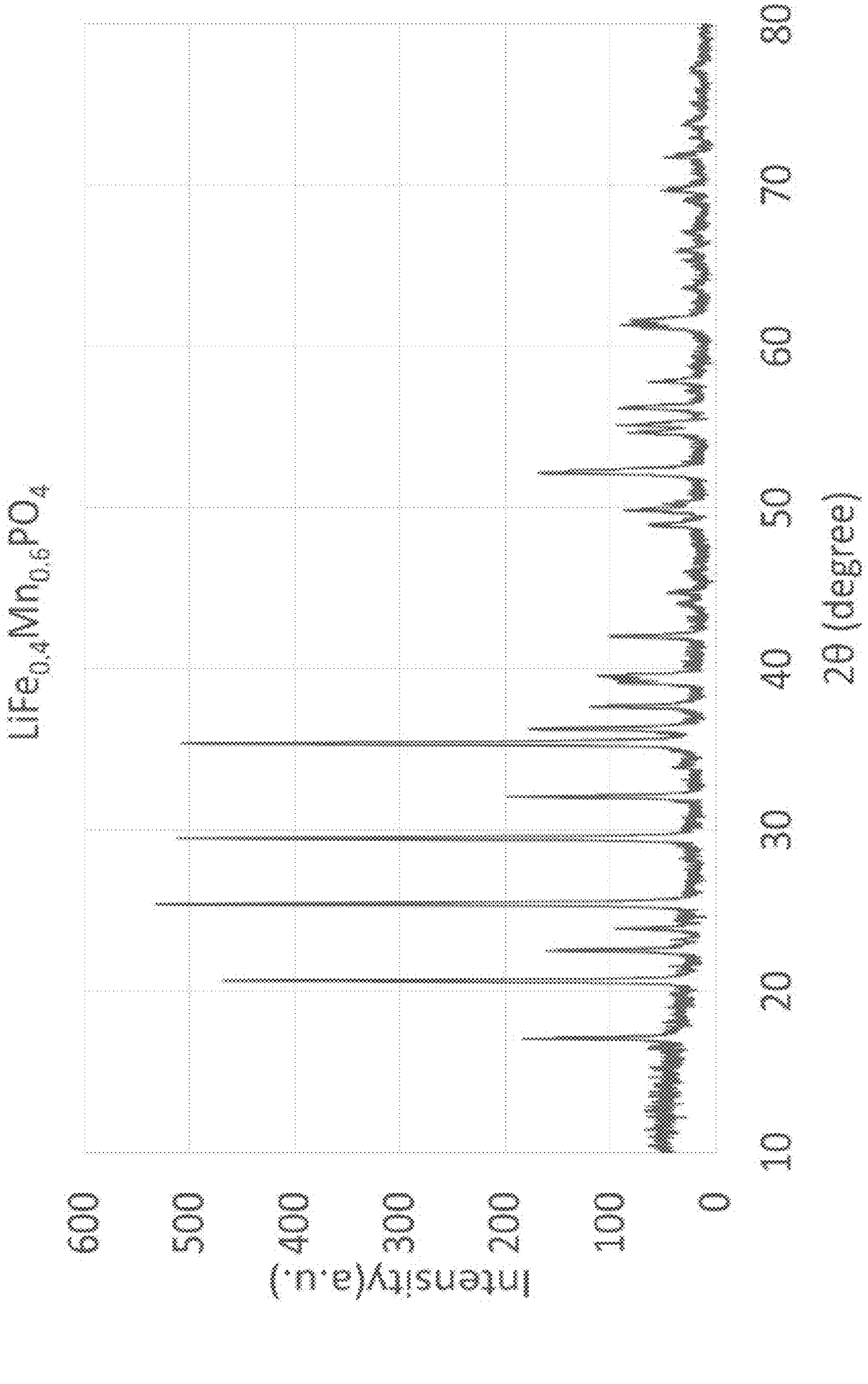
FIG. 6 shows an X-ray diffraction pattern of $LiFeMnPO_4$ obtained in an exemplary embodiment of the present invention.
Figure 7:
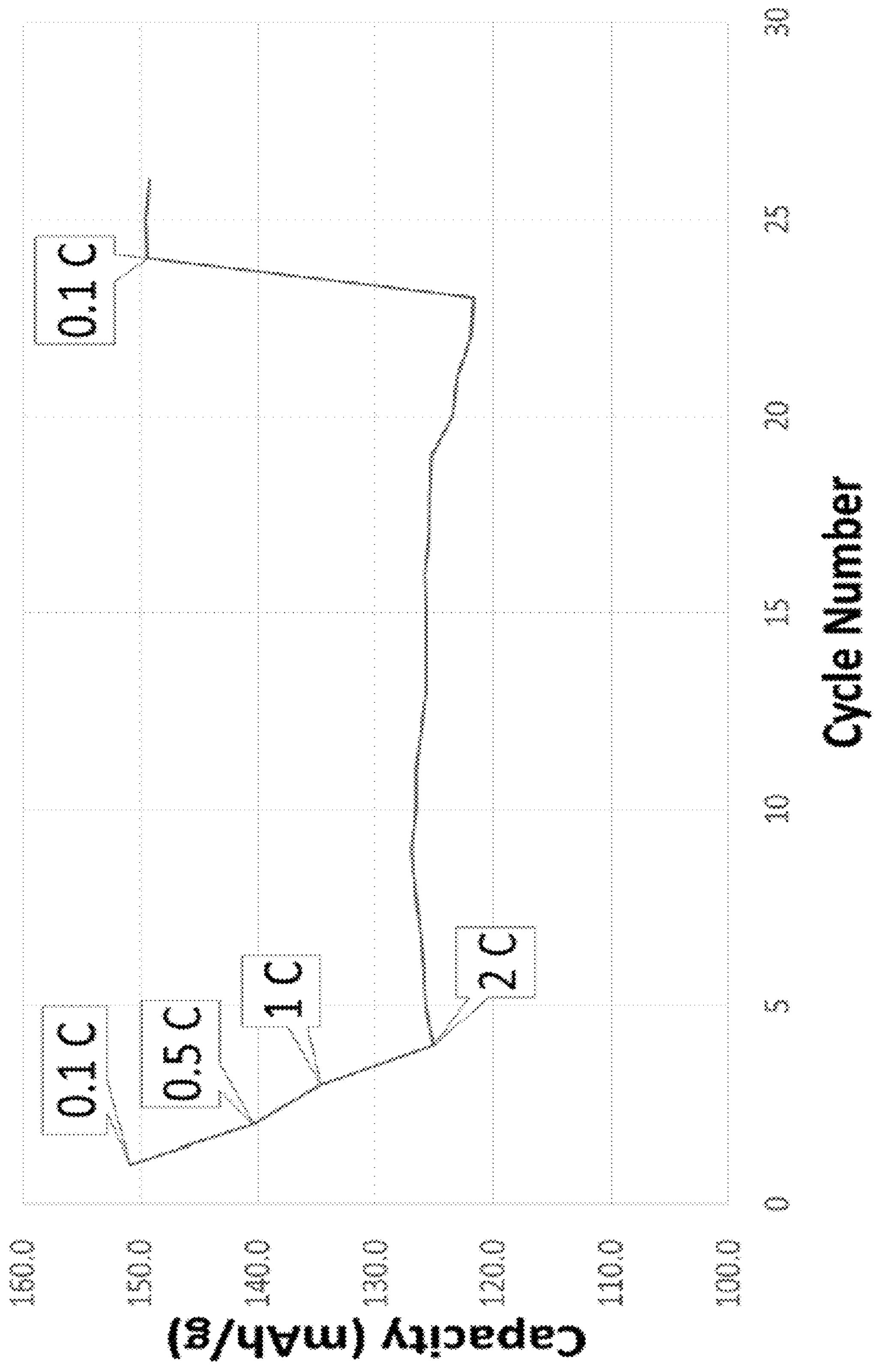
FIG. 7 shows the charge/discharge performance (Capacity vs. Cycle Number) of $LiFeMnPO_4$ obtained in an exemplary embodiment of the present invention.
Figure 8:
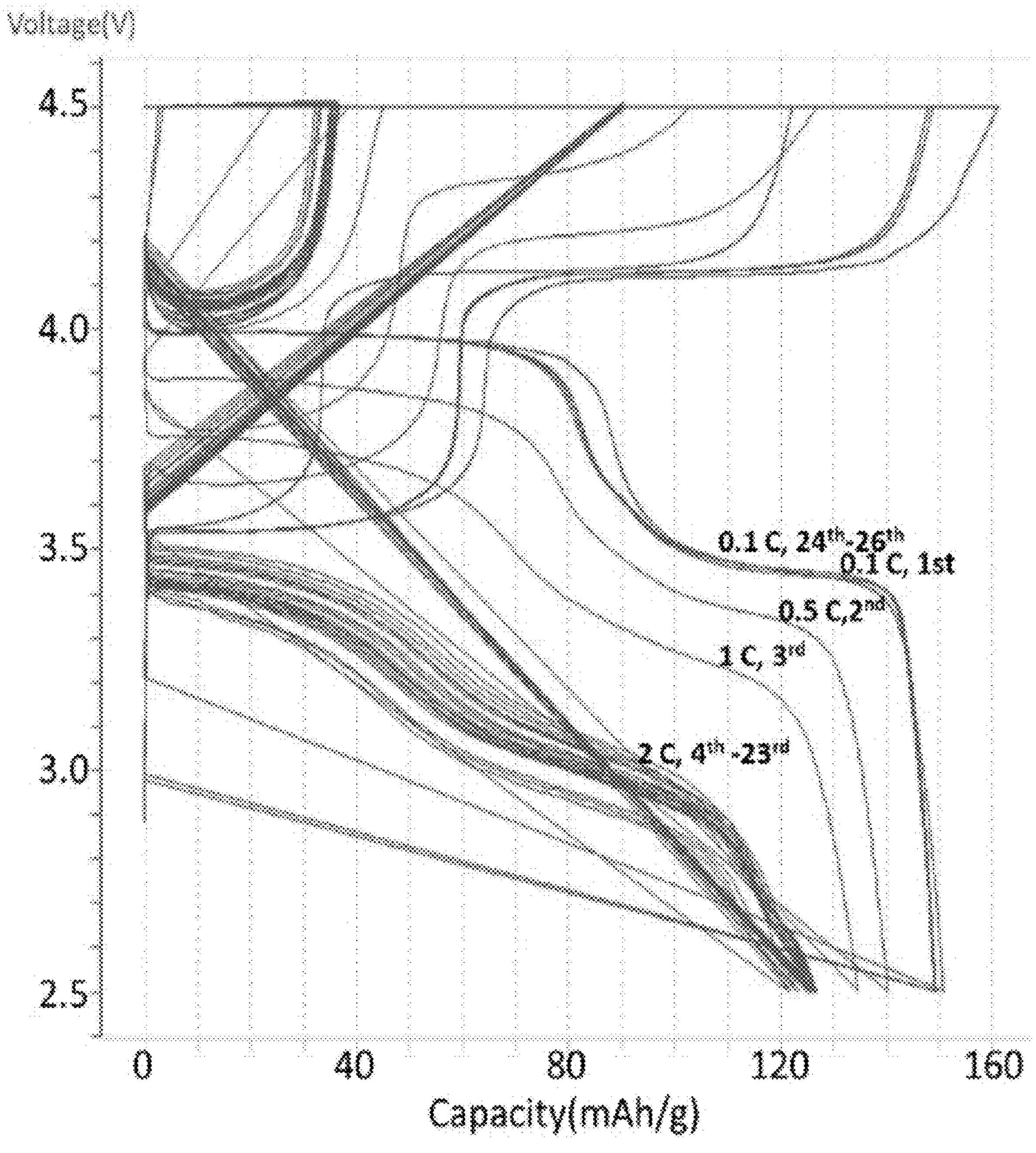
FIG. 8 shows the charge/discharge performance (Voltage vs. Capacity) of $LiFePO_4$ obtained in an exemplary embodiment of the present invention.
Figure 9:
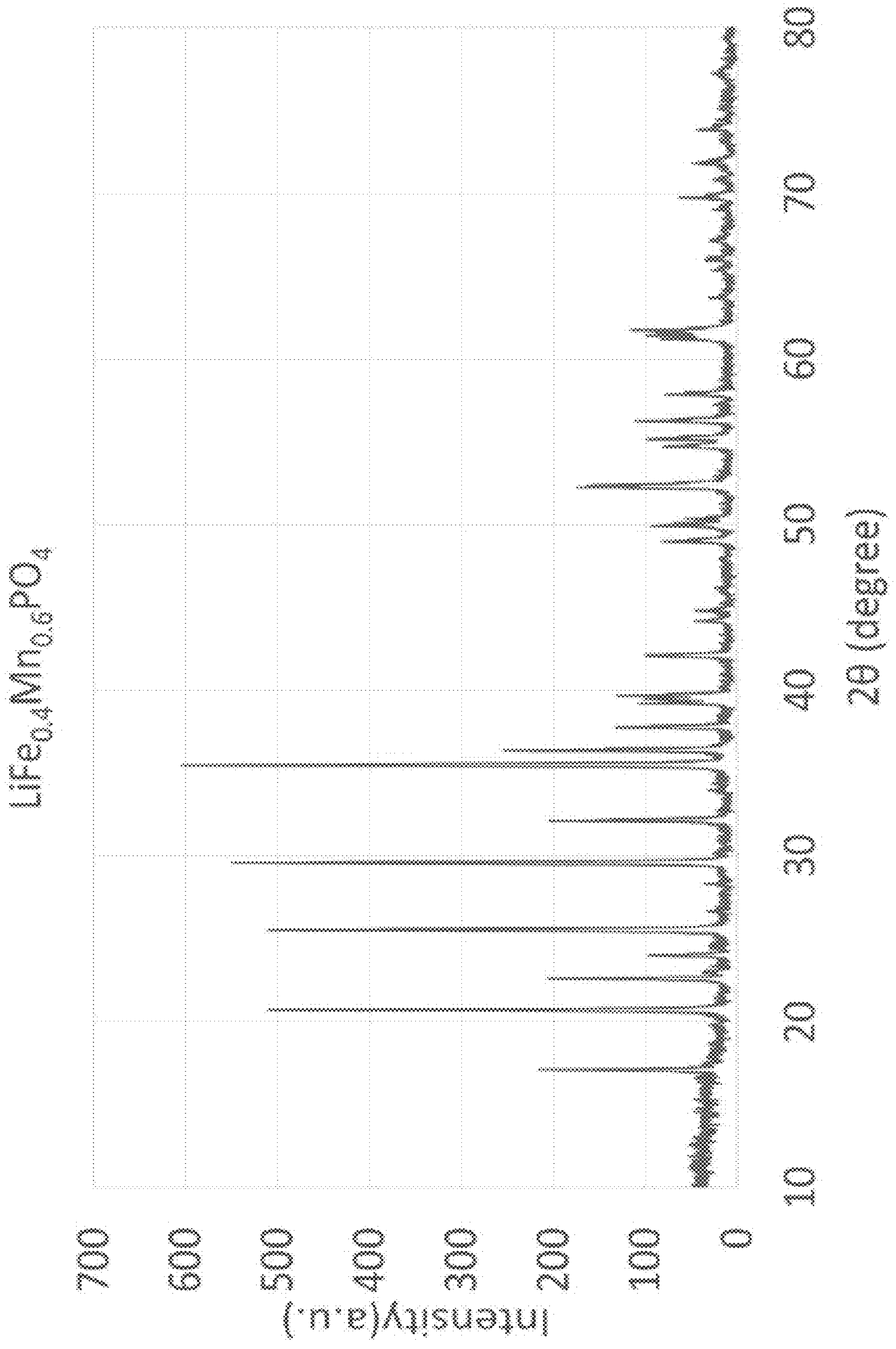
FIG. 9 shows an X-ray diffraction pattern of $LiFeMnPO_4$ obtained in an exemplary embodiment of the present invention.
Figure 10:
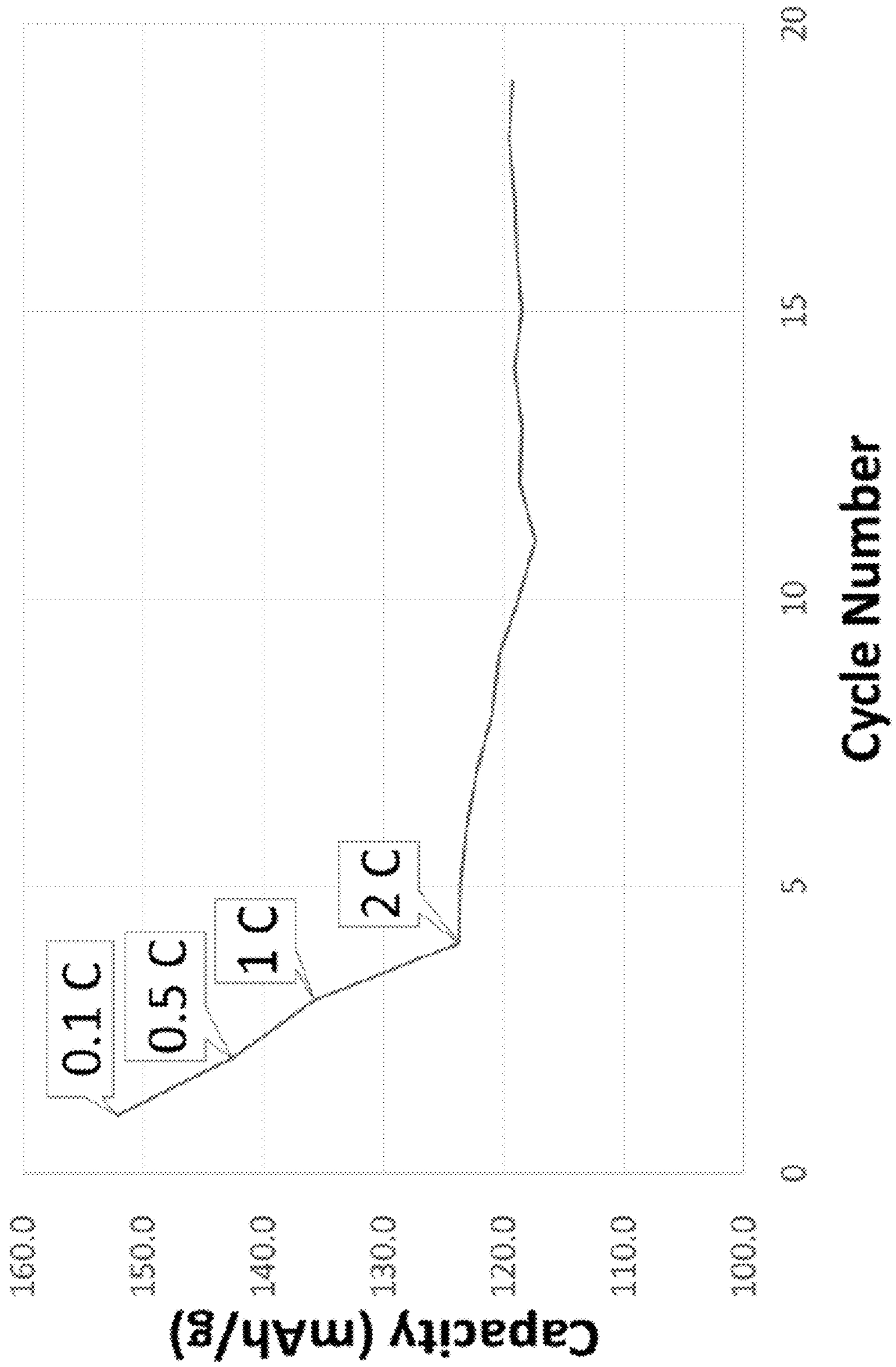
FIG. 10 shows the charge/discharge performance (Capacity vs. Cycle Number) of $LiFeMnPO_4$ obtained in an exemplary embodiment of the present invention.
Figure 11:
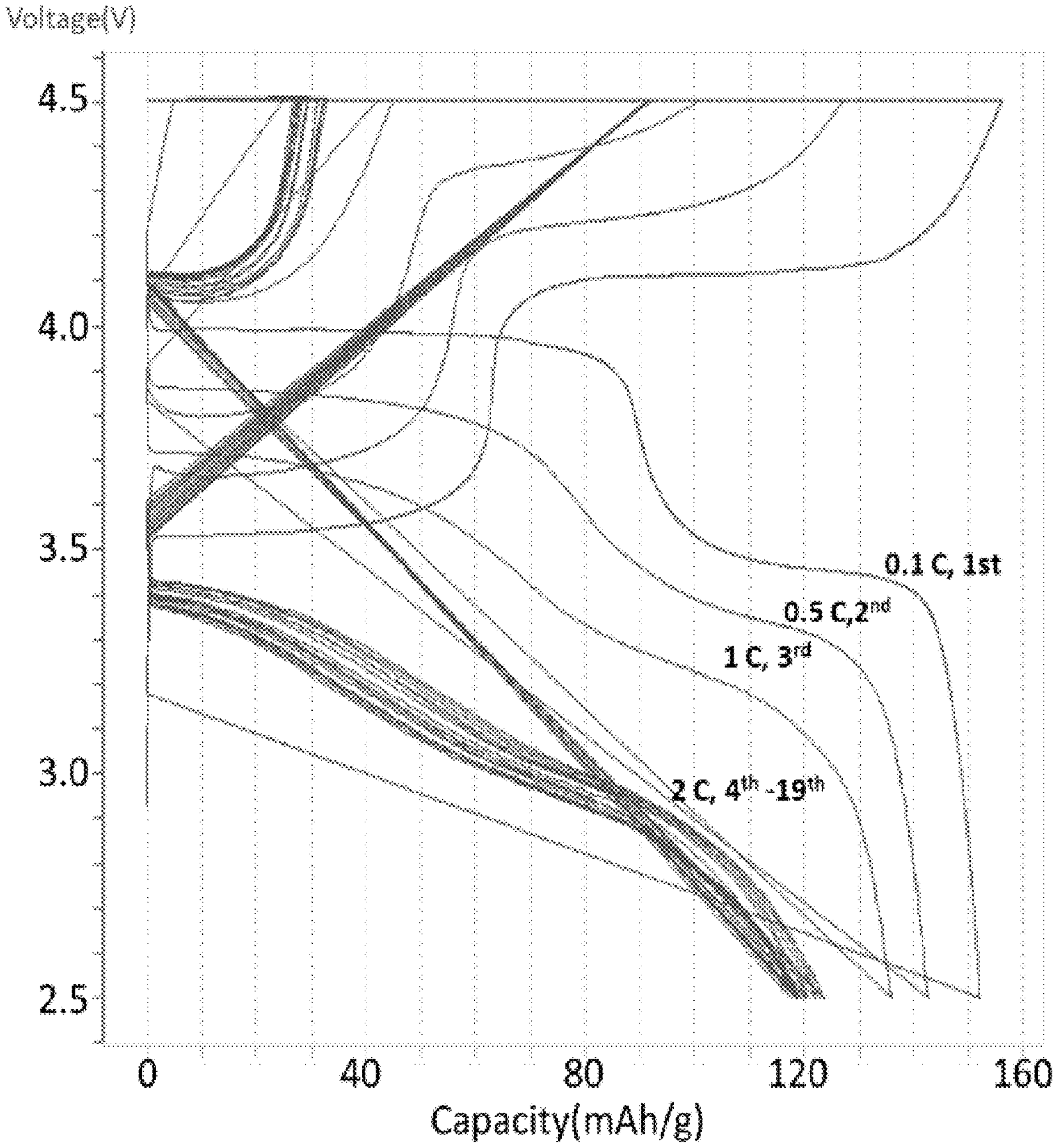
FIG. 11 shows the charge/discharge performance (Voltage vs. Capacity) of $LiFeMnPO_4$ obtained in an exemplary embodiment of the present invention.

FIG. 2 shows an X-ray diffraction pattern of $LiFePO_4$ obtained in Example 6. FIG. 3 shows the charge/discharge performance (Voltage vs. Capacity) of $LiFePO_4$ obtained in Example 6. FIG. 4 shows an X-ray diffraction pattern of $LiFePO_4$ obtained in Example 5. FIG. 5 shows the charge/discharge performance (Voltage vs. Capacity) of $LiFePO_4$ obtained in Example 5. FIG. 6 shows an X-ray diffraction pattern of $LiFe_{0.4}Mn_{0.6}PO_4$ obtained in Example 27. FIG. 7 shows the charge/discharge performance (Capacity vs. Cycle Number) of $LiFe_{0.4}Mn_{0.6}PO_4$ obtained in Example 27. FIG. 8 shows the charge/discharge performance (Voltage vs. Capacity) of $LiFePO_4$ obtained in Example 27. FIG. 9 shows an X-ray diffraction pattern of $LiFe_{0.4}Mn_{0.6}PO_4$ obtained in Example 24. FIG. 10 shows the charge/discharge performance (Capacity vs. Cycle Number) of $LiFe_{0.4}Mn_{0.6}PO_4$ obtained in Example 24. FIG. 11 shows the charge/discharge performance (Voltage vs. Capacity) of $LiFe_{0.4}Mn_{0.6}PO_4$ obtained in Example 24. The X-ray diffraction pattern, the charge/discharge performance (Voltage vs. Capacity), and the charge/discharge performance (Capacity vs. Cycle Number) were measured or tested using known methods in the field, the details of which are omitted here for conciseness.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. A process of synthesizing a target cathode material, comprising:

(i) mixing a P source containing element P with a first metal source containing one or more metal elements selected from Fe, Mn, Co, Ni, Cu, Zn, Al, Ca, Mg, Ti, V, Cr, Mo or any combination thereof, to form a first intermediate material, wherein a portion of at least one element among said one or more metal elements is oxidized;

(ii) mixing and reacting the first intermediate material with an oxidizing agent to oxidize a remaining portion of said at least one element among said one or more metal elements, to form a second intermediate material without any further processing; and (iii) immediately after the second intermediate material is produced in step (ii), mixing it with one or more add-on source materials selected from a P source containing element P, a first metal source containing one or more metal elements selected from Fe, Mn, Co, Ni, Cu, Zn, Al, Ca, Mg, Ti, V, Cr, Mo or any combination thereof, and a second metal source containing one or more elements selected from Li, Na, K or any combination thereof;

wherein said one or more add-on source materials are introduced in an amount or amounts that are needed for accomplishing a formula of the target cathode material; and wherein said steps (i), (ii) and (iii) are conducted in one single container.

2. The process according to claim 1, wherein the second intermediate material produced in step (ii) is not centrifuged and washed before it is mixed with said one or more add-on source materials is step (iii).

3. The process according to claim 1, wherein said P source in step (i) and step (iii) is selected from $H_3PO_4$, a salt of $H_2PO_4^-$, a salt of $HPO_4^{2-}$, a salt of $PO_4^{3-}$, or any combination thereof; and wherein said first metal source in step (i) comprises a metallic powder of Fe, Mn, Co, Ni, Cu, Zn, Al, Ca, Mg, Ti, V, Cr, Mo or any combination thereof.

4. The process according to claim 1, wherein said P source in step (i) comprises 5-55% $H_3PO_4$; and wherein said first metal source in step (i) comprises iron powder and/or Mn powder.

5. The process according to claim 1, wherein said oxidizing agent in step (ii) is selected from $O_2$, $H_2O_2$, $HNO_3$, KMnO4, NaMnO4, or any combination thereof.

6. The process according to claim 1, wherein step (i) further includes heating the reaction mixture in the container to an elevated temperature for 1-10 hours; and step (ii) further includes maintaining the reaction mixture in the container at an elevated temperature.

7. The process according to claim 1, wherein said first metal source in step (iii) comprises a metal compound selected from oxides, hydrogen carbonates, hydrogen sulfates, hydrogen oxalates, carbonates, sulfates, and oxalates of Fe, Mn, Co, Ni, Cu, Zn, Al, Ca, Mg, Ti, V, Cr, Mo or any combination thereof.

8. The process according to claim 1, wherein said first metal source in step (iii) comprises a metal compound selected from FeO, $Fe_2O_3$, $Fe_3O_4$, $FeC_2O_4$, MnO, $Mn_2O_3$, $Mn_3O_4$, $MnCO_3$, $MnO_2$, CoO, $Co_2O_3$, and $Co_3O_4$.

9. The process according to claim 1, wherein said second metal source in step (iii) comprises a metal compound selected from oxides, hydroxides, carbonates, hydrogen carbonates, phosphates, hydrogen phosphates, dihydrogen phosphates, nitrates, oxalates and hydrogen oxalates of Li, Na, K or any combination thereof.

10. The process according to claim 1, wherein said second metal source in step (iii) comprises a metal compound selected from $Li_2O$, LiOH, $Li_2CO_3$, $LiHCO_3$, $Li_3PO_4$, $Li_2HPO_4$, $LiH_2PO_4$, $Li_2C_2O_4$, $LiHC_2O_4$, $LiNO_3$, $Na_2O$, NaOH, $Na_2CO_3$, $NaHCO_3$, $Na_3PO_4$, $Na_2HPO_4$, $NaH_2PO_4$, $Na_2C_2O_4$, $NaHC_2O_4$, $K_2O$, KOH, $K_2CO_3$, $KHCO_3$, $K_3PO_4$, $K_2HPO_4$, $KH_2PO_4$, $K_2C_2O_4$, $KHC_2O_4$, $NaNO_3$, $KCH_3CO_2$, $KHCO_2$, and $KNO_3$.

11. The process according to claim 1, wherein said P source and said first metal source in step (iii) are combined into a composite source.

12. The process according to claim 11, wherein the composite source is a mixture of compounds.

13. The process according to claim 1, wherein said P source and said second metal source in step (iii) are combined into a composite source.

14. The process according to claim 13, wherein the composite source is selected from $Li_3PO_4$, $Na_3PO_4$, $K_3PO_4$, $Li_2HPO_4$, $Na_2HPO_4$, $K_2HPO_4$, $LiH_2PO_4$, $NaH_2PO_4$, and $KH_2PO_4$.

15. The process according to claim 1, wherein said first metal source and said second metal source in step (iii) are combined into a composite source.

16. The process according to claim 15, wherein the composite source is selected from $KMnO_4$ and $NaMnO_4$.

17. The process according to claim 1, wherein step (iii) further comprises mixing the second intermediate material with a C source material.

18. The process according to claim 17, further comprising milling or grinding the product from step (iii) to cream-like particles having an average size of 300~400 nm after step (iii) is completed.

19. The process according to claim 18, further comprising drying the cream-like particles to produce dry particles in a powder form.

20. The process according to claim 19, further comprising calcining the dry particles into a solid, grinding the solid into ground particles, and sieving the ground particles to collect nanosized carbon-coated cathode materials.

* * * * *